(12) United States Patent
Wang et al.

(10) Patent No.: US 11,665,130 B2
(45) Date of Patent: May 30, 2023

(54) METHOD FOR PROPAGATING MOVEMENT EVENT MESSAGE OF NETWORK ENTITY

(71) Applicants: INSTITUTE OF ACOUSTICS, CHINESE ACADEMY OF SCIENCES, Beijing (CN); BEIJING HILI TECHNOLOGY CO. LTD, Beijing (CN)

(72) Inventors: Jinlin Wang, Beijing (CN); Jun Chen, Beijing (CN); Gang Cheng, Beijing (CN); Xiaozhou Ye, Beijing (CN); Haojiang Deng, Beijing (CN); Lingfang Wang, Beijing (CN); Weining Qi, Beijing (CN)

(73) Assignees: INSTITUTE OF ACOUSTICS, CHINESE ACADEMY OF SCIENCES, Beijing (CN); BEIJING HILI TECHNOLOGY CO. LTD, Beijing (CN)

( * ) Notice: Subject to any disclaimer, the term of this patent is extended or adjusted under 35 U.S.C. 154(b) by 189 days.

(21) Appl. No.: 16/973,740

(22) PCT Filed: May 29, 2019

(86) PCT No.: PCT/CN2019/088961
§ 371 (c)(1),
(2) Date: Dec. 9, 2020

(87) PCT Pub. No.: WO2020/098254
PCT Pub. Date: May 22, 2020

(65) Prior Publication Data
US 2021/0258282 A1 Aug. 19, 2021

(30) Foreign Application Priority Data
Nov. 16, 2018 (CN) .......................... 201811366932.2

(51) Int. Cl.
*H04L 61/2517* (2022.01)
*H04L 49/253* (2022.01)
(Continued)

(52) U.S. Cl.
CPC .......... *H04L 61/2517* (2013.01); *H04L 45/02* (2013.01); *H04L 45/26* (2013.01);
(Continued)

(58) Field of Classification Search
CPC ............ H04L 61/2517; H04L 61/5053; H04L 61/4552; H04L 45/02; H04L 45/26; H04L 45/745; H04L 49/253
See application file for complete search history.

(56) References Cited

U.S. PATENT DOCUMENTS

| 7,990,993 B1 * | 8/2011 | Ghosh ................... H04L 45/025 370/428 |
| 11,088,937 B1 * | 8/2021 | Zhou ....................... H04L 45/02 |

(Continued)

FOREIGN PATENT DOCUMENTS

| CN | 101621550 A | 1/2010 |
| CN | 103561442 A | 2/2014 |

(Continued)

OTHER PUBLICATIONS

Zhu et al., "Popularity-based Neighborhood Collaborative Caching for Information-Centric Networks," 2017 IEEE 36th International Performance Computing and Communications Conference (IPCCC), Feb. 5, 2018.

(Continued)

*Primary Examiner* — Dhairya A Patel
*Assistant Examiner* — Eui H Kim
(74) *Attorney, Agent, or Firm* — Oliff PLC

(57) ABSTRACT

A method for propagating a movement event message of a network entity, including: step 1) a network device main-
(Continued)

taining a historical forwarded information list, wherein a network device capable of receiving a movement event message from an external system or device maintains an uplink port information table; step 2) after receiving the message, the network device performs matching using the table to obtain a forwarding port and forwarding information of the message, and constructs a movement event forwarding message using the information and forwards through the forwarding port; and step 3) after a device receives the message, searching for a matching forwarding port and forwarding information of the message in the information list, modifying the message using the forwarding information, and forwarding the modified message through the forwarding port. The method is able to propagate a movement event message to a network device responsible for related data transmission and forwarding.

6 Claims, 2 Drawing Sheets

(51) Int. Cl.
*H04L 45/02* (2022.01)
*H04L 45/00* (2022.01)
*H04L 45/745* (2022.01)
*H04L 61/4552* (2022.01)
*H04L 61/5053* (2022.01)

(52) U.S. Cl.
CPC .......... *H04L 45/745* (2013.01); *H04L 49/253* (2013.01); *H04L 61/4552* (2022.05); *H04L 61/5053* (2022.05)

(56) References Cited

U.S. PATENT DOCUMENTS

| | | | |
|---|---|---|---|
| 2008/0205302 A1* | 8/2008 | Florit | H04L 12/462 370/255 |
| 2009/0225965 A1* | 9/2009 | Migishima | H04L 65/1104 379/142.04 |
| 2011/0075668 A1* | 3/2011 | Matsushita | H04L 65/65 370/392 |
| 2013/0058229 A1* | 3/2013 | Casado | H04L 45/745 370/252 |
| 2015/0172186 A1* | 6/2015 | Kizu | H04L 45/34 370/392 |
| 2018/0159941 A1* | 6/2018 | Brandstätter | H04L 67/148 |
| 2020/0021540 A1* | 1/2020 | Marolia | H04L 49/3009 |

FOREIGN PATENT DOCUMENTS

| | | |
|---|---|---|
| CN | 103581341 A | 2/2014 |
| CN | 106059921 A | 10/2016 |
| CN | 108093084 A | 5/2018 |

OTHER PUBLICATIONS

Aug. 28, 2019 International Search Report issued in International Patent Application No. PCT/CN2019/088961.

* cited by examiner

METHOD FOR PROPAGATING MOVEMENT EVENT MESSAGE OF NETWORK ENTITY

RELATED APPLICATION

This application claims priority to Chinese patent application No. 2018113669322, entitled "Method for Propagating Movement Event Message of Network Entity" filed on Nov. 16, 2018, which is incorporated herein by reference.

FIELD OF THE INVENTION

The present invention relates to the field of network technology and communication technology, in particular, to a method for propagating a movement event message of a network entity.

BACKGROUND OF THE INVENTION

Movement of a network terminal may cause IP address changes in an existing Internet system. Information-centric networking (ICN) has a core concept that the name is separated from the address, and adopts a naming mechanism of ICN, in which each entity in the network obtains a location-independent unique identifier of the entity as its name, and by dynamically binding the name of the entity and the current network address of the entity, the problem of IP address changes during communication may be solved.

SUMMARY OF THE INVENTION

An object of the present invention is to provide a method for propagating a movement event message of a network entity. When a network entity changes its bound network address value due to movement, a network entity movement event message can be quickly and efficiently propagated to network devices related to current communication data forwarding of the moved network entity, by controlling a propagation path and range of the event message representing movement information of the network entity.

DETAILED DESCRIPTION OF THE EMBODIMENTS

Figure 1:
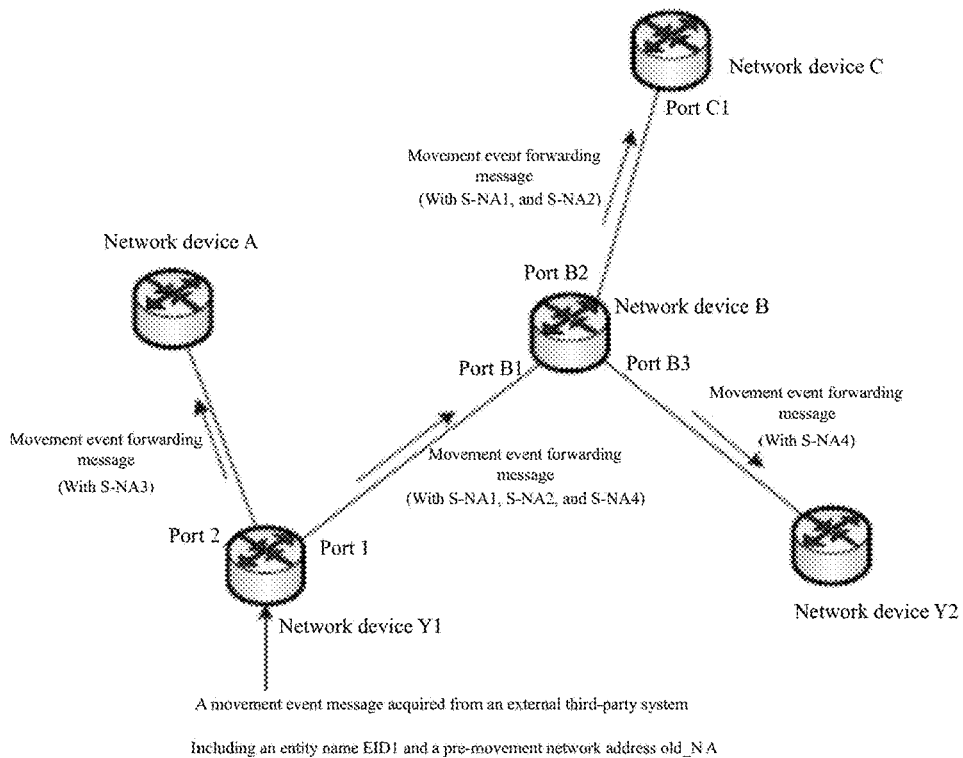
FIG. 1 is a schematic diagram of propagation of a movement event message among network devices in the present invention.

The present invention will be described in detail below in conjunction with the accompanying drawings and specific embodiments.

A technical problem to be solved by the present invention is after receiving a movement event message indicating that a network address bound to a network entity has changed due to movement of the network entity, how to propagate the movement event message to network devices that are now responsible for related data transmission with the network entity, so that these network devices are informed of the network entity movement event in time, so as to perform subsequent corresponding processing to improve data transmission performance and improve service continuity guarantee.

The present invention proposes a method for propagating a movement event message of a network entity. The method includes the following steps:

Step 1) A network device maintains a historical forwarded information list based on information of forwarded data, wherein a network device capable of receiving a movement event message from an external system or device also maintains an uplink port information table based on information of received data.

The content of the uplink port information table includes destination network entity names, destination network addresses, source network addresses and the ingress port identifiers of the received data.

The network entity name refers to unique identification information of a network entity that with a independent network address, including using existing identification information of an existing system, or its hash or other unidirectional conversion calculation value, or a combination of the above-mentioned information.

The network address refers to network-routable address information indicating the location of the network entity, including using an IP address or other information.

The ingress port identifier refers to a physical port through which the network device receives a network data packet.

The destination network entity name, destination network address and source network address respectively correspond to destination network entity name, destination network address and source network address information included in the network data packet received at the ingress port;

The network data packet carries the destination network entity name, destination network address and source network address information, and always keeps the destination network entity name therein unchanged during network transmission.

The content of the historical forwarded information list includes egress port identifiers, source network addresses and destination network addresses of the data forwarded by the network device.

The egress port identifier refers to a physical port through which the network device forwards a network data packet.

The source network address refers to a source network address of the data packet that has been forwarded from the egress port.

The destination network address refers to a destination network address of the data packet that has been forwarded from the egress port.

The content in the historical forwarded information list corresponds to information of network data packets that have been forwarded within a period of time.

The maintenance of the uplink port information table by the network device includes information generation, update and deletion. A method for generating and updating an uplink port information table includes the following steps:

Step A1) For a received network data packet, a network device acquires information such as a destination network entity name, a source network address and a destination network address in the data packet, and an identifier of a port that has received the data packet, and searches for corresponding entries in the uplink port information table by using the information.

Step A2) If there is an entry identical to the current packet information in the uplink port information table, the survival time in the entry is extended; otherwise, a new entry is added to the uplink port information table, wherein the value of the entry includes a destination network entity name, a source network address and a destination network address of the data packet, and an identifier of a physical port receiving the current packet.

Step A3) A method for deleting the uplink port information table includes: periodically monitoring the survival time (time parameter) of each entry in the uplink port table, and after finding that its deviation from the current time exceeds a set threshold, deleting the entry from the uplink port information table.

The maintenance of the historical forwarded information list by the network device includes information generation, update and deletion, and may be performed based on ports.

The information generation means that when the network device performs data packet forwarding, for each data packet to be forwarded, information such as its source network address and destination network address is recorded. Before recording, it may also choose whether to carry out duplicate-checking. The information update and deletion means that an appropriate information refresh duration range may be set according to calculations of memory resources, port bandwidth and the like of each port, and information may be updated and cleared by means of a sliding window.

Step 2) After receiving the movement event message sent by the external system or device, the network device with the uplink port information table performs matching by using the uplink port information table to obtain a forwarding port and forwarding information of the movement event message, and constructs a movement event forwarding message by using the forwarding information and forwards the movement event forwarding message through the forwarding port.

Step 3) After a network device receives the movement event forwarding message, a matching forwarding port and forwarding information of the movement event forwarding message are searched for in the historical forwarded information list, the movement event forwarding message is modified by using the forwarding information, and then the modified movement event forwarding message is forwarded through the forwarding port.

A process of propagating, by the network device, the movement event message by using the uplink port information table in step 2) specifically includes the following steps:

Step 2-1) After receiving the movement event message sent by the external system or device, the network device with the uplink port information table extracts the name of a moved network entity and a pre-movement network address from the movement event message.

Step 2-2) In the uplink port information table, all entries that match both the name of the moved network entity and the pre-movement network address are searched for based on "a destination network entity name and a destination network address"; if there is no matching entry, then the movement event message is not propagated; otherwise, step 2-3) is executed.

Step 2-3) "Source network address" and "ingress port identifier" information from all matching entries found are extracted, and "source network address" values therein are grouped according to their corresponding ingress port identifier values to form source network address sets respectively corresponding to different ingress port identifiers, Each source network address set is a set of different source network address values corresponding to the same ingress port identifier, and includes N source network address values; and N is at least 1; and Step 2-4) For the ingress port identifiers after grouping, a port corresponding to a current "ingress port identifier" is used as the forwarding port; a source network address set corresponding to the current "ingress port identifier" is merged into the received movement event message, to construct the movement event forwarding message; the movement event forwarding message is sent to a network device connected to the current forwarding port.

As shown in FIG. 1, assume that a network device Y1 acquires a movement event message from an external third-party system device, wherein the message carries a network entity name EID1 and a pre-movement network address old_NA. The specific format of the movement event message may be customized according to the actual implementation requirement, and may be ICN message encapsulation, or message encapsulation based on IP or other existing network protocol.

Figure 2:
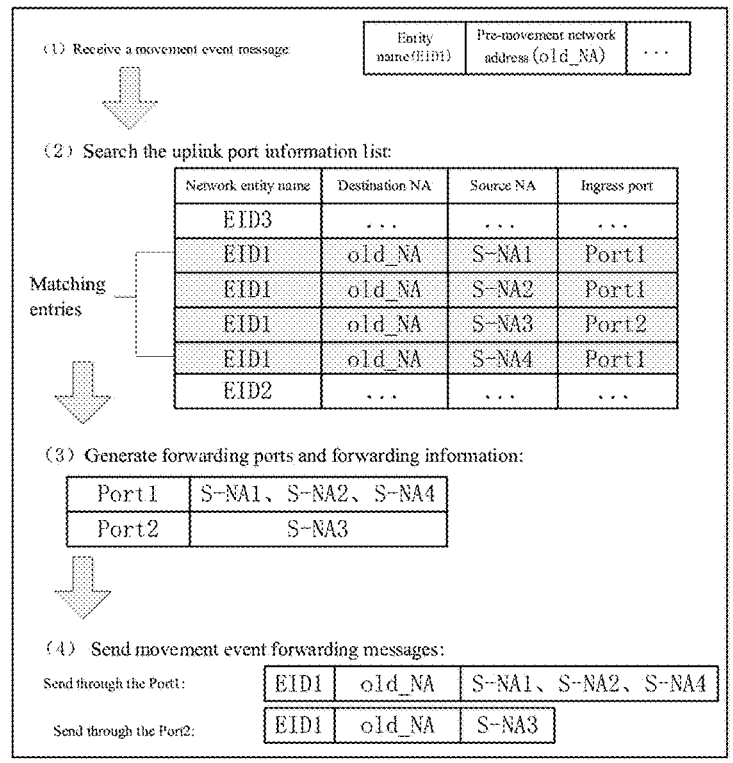
FIG. 2 is a schematic diagram of a process of message propagation by a network device using an uplink port information table in the present invention.

As shown in FIGS. 1 and 2, the network device Y1 extracts the network entity name EID1 and the pre-movement network address old_NA from the movement event message, and searches for all entries that match "EID1, old_NA" in the uplink port information table maintained by the device, based on a combined field of "a destination network entity name and a destination network address"; and then groups all of 4 matching entries according to ingress port identifiers, to generates two sets of information: port1 and its corresponding source network address set {S-NA1|S-NA2|S-NA4}, and port2 and its corresponding source network address set {S-NA3}, wherein the two sets of information are used as subsequent forwarding ports and forwarding information;

Using the above two sets of information, respective movement event forwarding messages corresponding to the two forwarding ports port1 and port2 are constructed respectively. The information carried in each movement event forwarding message includes the name of the network entity EID1, the pre-movement network address old_NA of the entity, and the source network address set corresponding to the forwarding port.

Then, the movement event forwarding messages corresponding to the respective ports are sent from the port1 and port2 respectively.

A process of propagating, by the network device, the movement event message by using the historical forwarded information list in step 3) specifically includes the following steps:

Step 3-1) After receiving the movement event message, the network device (hereinafter referred to as the querying network device) sends an inquiry message to its neighbor network devices.

The neighbor network devices refer to network devices connected to the querying network device at ports other than a port that has received the movement event message.

The content of the inquiry message includes: a source network address set, a destination network address, and the like, wherein the source network address set corresponds to part or all of the source network address set acquired from the movement event message, and the destination network address value corresponds to the pre-movement network address old_NA acquired from the movement event message.

Step 3-2) The network device receiving the inquiry message searches the historical forwarded information list; if an entry matching the inquiry message is found, a "yes" response message is sent to the network device sending the inquiry message, and step 3-3) is executed; otherwise, a "none" response message is sent to the network device sending the inquiry message, and it proceeds to step 3-4).

Step 3-2) specifically includes:

Step 3-2-1) After receiving the inquiry message, the network device extracts a receiving port identifier of a port that has received the inquiry message, and values of "every source network addresses" in the source network address set and the "destination network address"; and merges the receiving port identifier, the values of the "source network addresses" and the "destination network address" into search information, to obtain a total of N pieces of search information.

Step 3-2-2) Entries matching the search information are searched for one by one in the historical forwarded information list.

The "receiving port identifier", "source network addresses" and "destination network address" of the search information are respectively in one-to-one correspondence with values of an "egress port identifier", "source network addresses" and an "destination network address" of forwarded data in the historical forwarded information list.

Step 3-2-3) If there is an entry that matches the search information in the history forwarding information table, a response message indicating "yes" is sent from a port that has received the inquiry message; if not, a response message indicating "none" is sent from the port that has received the inquiry message, or no response is made, wherein the response message further includes a set of M "source network address" values that match the search information.

Step 3-3) The network device uses a port that has received the "yes" response message as a subsequent forwarding port, wherein the response message contains subsequent forwarding information; the movement event forwarding message is modified; and the modified movement event forwarding message is sent from the port that has received the "yes" response message.

An executing process of modifying the movement event forwarding message based on the subsequent forwarding information contained in the "yes" response message in step 3-3) is as follows:

The set of M "source network address" values in the response message are extracted, and the movement event forwarding message is modified, wherein the content of the modified movement event forwarding message includes: the name of the moved network entity, the pre-movement network address, and the set of M "source network address" values extracted from the response message.

The step 3) further includes: a step of periodic check: the network device periodically checks the source network address set acquired from the movement event forwarding message to determine whether all the source network addresses are involved in the received response message indicating "yes";

If "so", the propagation is ended.

Otherwise, it is determined whether cumulative execution times of the above-mentioned periodic check reaches a maximum upper limit, and if "so", the propagation of the movement event forwarding message is ended.

For each source network address that is not involved in the received response indicating "yes", an inquiry message is sent again to the network devices connected to the ports other than the port that has received the movement event forwarding message.

A minimum value of the maximum upper limit of the times of periodic check is set to 1.

Figure 3:
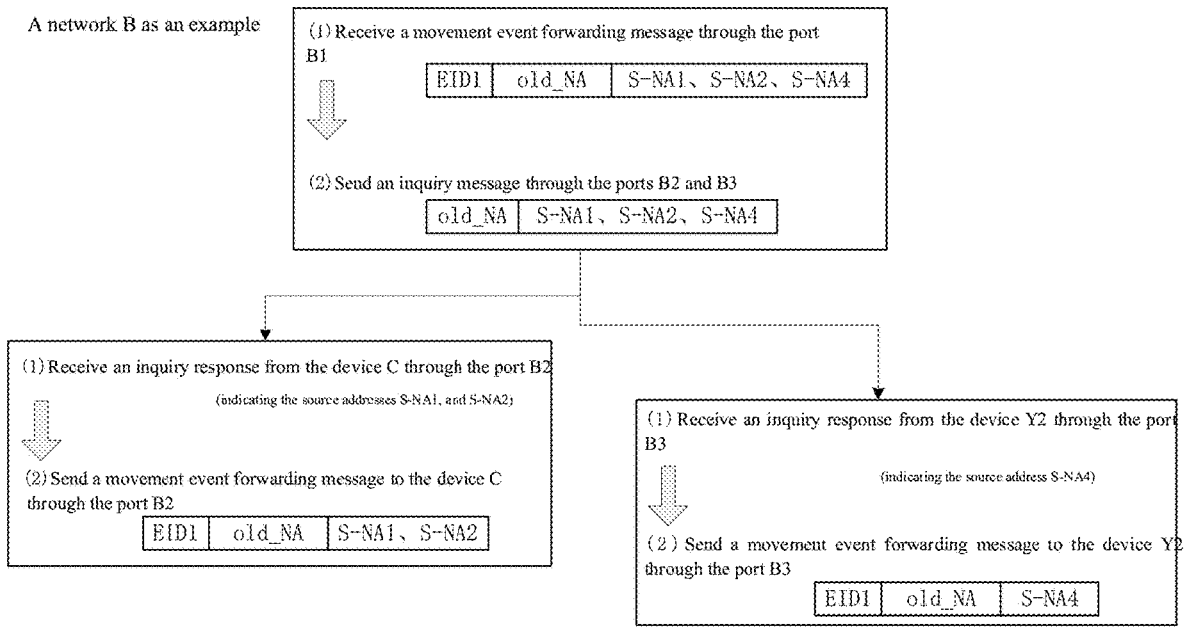
FIG. 3 is a schematic diagram of a process of initiating an inquiry and processing a response by a network device in the present invention.

As shown in FIGS. 1 and 3, Using a network device B as an example, the movement event forwarding message received by the device is sent from the port1 of the network device Y1, and already carries the source network address set {S-NA1|S-NA2|S-NA4}. At that time, for the propagation determination of the movement event forwarding message, neighbor network devices of network device B are neighbor network devices C and Y2 respectively connected to ports B2 and B3 other than the port B1 that has received the movement event message.

Hence, the network device B sends an inquiry message to the neighbor network devices C and Y2. The content of the inquiry message includes source network addresses, a destination network address, and the like, wherein the destination network address value corresponds to the pre-movement network address acquired from the movement event forwarding message, that is, old_NA; and the source network addresses may be all or part of the set {S-NA1|S-NA2|S-NA4}, that is, all of the related source network address set may be carried in one inquiry message in a one-inquiry mode, or all of the related source network address set may also be covered by multiple inquiry messages in a multi-inquiry mode. Subsequent processing procedures are described as follows:

(1) In the case of one-inquiry mode, the network device B and its neighbor network device C are used as an example:

The source network address set carried in one-inquiry information sent by the network device B is {S-NA1|S-NA2|S-NA4}.

Figure 4:
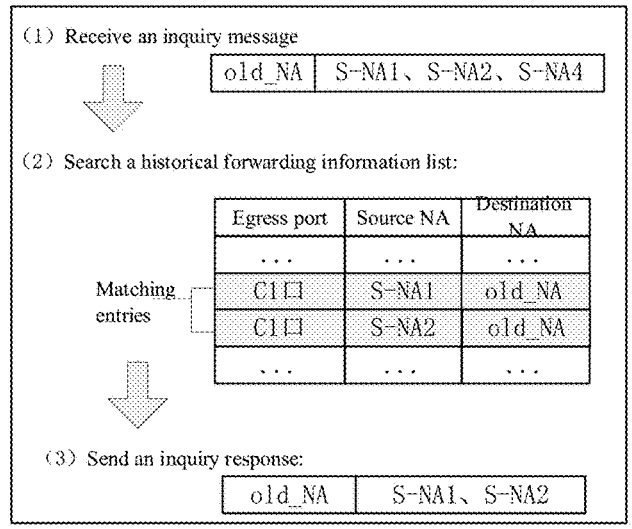
FIG. 4 is a schematic diagram of a process of a network device responding to an inquiry message in the present invention.

As shown in FIGS. 1 and 4, the neighbor network device C receives the above-mentioned inquiry message through a port C1 thereof, and thus performs matching and searching in the historical forwarded information list maintained thereby to determine whether there is an entry that matches "port C1, S-NA1, old_NA", "port C1, S-NA2, old_NA" and "port C1, S-NA4, old_NA". Finally, 2 records are found through the matching. Hence, based on the 2 matched records, a new source network address set {S-NA1|S-NA2} is generated, and an inquiry response message indicating "yes" is sent to network device B, wherein the message carries old_NA and the new source network address set {S-NA1|S-NA2}.

After receiving the above-mentioned inquiry response indicating "yes" from the port B2 thereof, the network device B immediately sends a movement event forwarding message to the neighbor network device C according to the source network address set {S-NA1|S-NA2} indicated in the inquiry response message, wherein the message carries the source network address set {S-NA1|S-NA2}.

(2) In the case of multi-inquiry mode in multiple times, the network device B and its neighbor network device C are used as an example:

Suppose that network device B sends three inquiry messages, and source network addresses carried therein are {S-NA1}, {S-NA2} and {S-NA4} respectively.

The neighbor network device C receives the above-mentioned three inquiry messages through its port C1, and thus performs matching and searching in the historical forwarded information list maintained by the device according to the inquiry message received each time, to determine whether there is an entry that matches "port C1, the source network address carried in this inquiry message, and old_NA".

Assuming that the source network address carried in this inquiry message is only {S-NA1}, then, according to a matching search result, the neighbor network device C sends an inquiry response message indicating "yes" to the port B2 of the network device B, wherein the message carries old_NA and a source network address value {S-NA1} matched this time. After receiving the above-mentioned inquiry response indicating "yes" from the port B2, the network device B immediately sends a movement event forwarding message to the neighbor network device C, wherein the message carries the source network address value {S-NA1}. Assuming that the source network address carried in the next inquiry message is only {S-NA4}, then, as no matching result is found, the neighbor network device C replies to the network device B with a response message indicating "none", or no response is made.

Similarly, the network device B may also send a movement event forwarding message to the network device Y2 according to an inquiry response indicating "yes" received from the port B3, wherein a source network addresses carried therein is {S-NA4}.

The querying network device may periodically check the source network address set acquired from the movement event forwarding message to determine whether all source network addresses are involved in the received response messages indicating "yes". If so, the propagation process of the movement event message is ended. Otherwise, it is further determined whether cumulative execution times of the above-mentioned periodic check reaches a maximum upper limit, and if "so", the propagation process of the movement event forwarding message is ended; otherwise, for each source network address that is not involved in the received response indicating "yes", an inquiry message is sent again to the network devices connected to the ports other than the port that has received the movement event forwarding message. A minimum value of the maximum upper limit of the times of periodic check may be set to 1.

All network devices participating in the propagation of the movement event message may also respectively analyze and determine whether to stop the propagation. A determination process includes the following steps:

Step s1) Based on the name of the network entity acquired from the movement event message or the movement event forwarding message, a post-movement network address NA corresponding to the network entity name is searched for at the external system.

Step s2) Egress ports corresponding to the above-mentioned post-movement network address NA and pre-movement network address old_NA are searched for and compared by using a forward information database (FIB) maintained by the network device; if the two egress ports are same, then it is determined that the propagation should be stopped.

The forward information database (FIB) is used to guide packet forwarding. Each forwarding item in the database indicates through which physical interface of the network device a packet to a certain network segment or a certain host address should be sent.

Finally, it should be noted that the above embodiments are only used for describing instead of limiting the technical solutions of the present invention. Although the present invention is described in detail with reference to the embodiments, persons of ordinary skill in the art should understand that modifications or equivalent substitutions to the technical solutions of the present invention should not depart from the spirit and scope of the technical solutions of the present invention, and should be encompassed within the scope of the claims of the present invention.

The invention claimed is:

1. A method for propagating a movement event message of a network entity, the method comprising:
   step 1) a network device maintaining a historical forwarded information list based on information of forwarded data, wherein a network device capable of receiving a movement event message from an external system or device also maintains an uplink port information table based on information of received data;
   step 2) after receiving the movement event message sent by the external system or device, the network device with the uplink port information table using the uplink port information table to obtain a matching forwarding port and forwarding information of the movement event message, and constructing a movement event forwarding message by using the forwarding information and the movement event forwarding message through a forwarding port; and
   step 3) after a network device receives the movement event forwarding message, searching for the matching forwarding port and forwarding information of the movement event forwarding message in the historical forwarded information list, modifying the movement event forwarding message by using the forwarding information, and then forwarding the modified movement event forwarding message through the forwarding port, wherein
   the movement event message contains the name of a moved network entity and a pre-movement network address of the network entity,
   the historical forwarded information list comprises recorded information of egress port identifiers, source network addresses and destination network addresses of the forwarded data,
   the uplink port information table comprises recorded information of destination network entity names, destination network addresses, source network addresses and the ingress port identifiers of the received data, wherein the destination network entity names remain unchanged during network transmission of the data, and
   the step 2) specifically comprises:
   step 2-1) after receiving the movement event message sent by the external system or device, the network device with the uplink port information table extracting the name of the moved network entity and the pre-movement network address from the movement event message;
   step 2-2) in the uplink port information table, searching for all entries that match both the name of the moved network entity and the pre-movement network address, based on "a destination network entity name and a destination network address"; if there is no matching entry, then not propagating the movement event message; otherwise, executing step 2-3);
   step 2-3) extracting "source network address" and "ingress port identifier" information from all matching entries found, and grouping "source network address" values therein according to their corresponding ingress port identifier values to form source network address sets respectively corresponding to different ingress port identifiers,
   wherein each source network address set is a set of different source network address values corresponding to the same ingress port identifier, and comprises N source network address values; and N is at least 1; and
   step 2-4) for the ingress port identifiers after grouping, using a port corresponding to a current "ingress port identifier" as the forwarding port; merging a source network address set corresponding to the current "ingress port identifier" into the received movement event message, to construct the movement event forwarding message; sending the movement event forwarding message to a network device connected to the current forwarding port.

2. The method for propagating a movement event message of a network entity according to claim 1, wherein step 3) specifically comprises:
   step 3-1) after receiving the movement event forwarding message, the network device sending an inquiry message to network devices connected to ports other than a port that has received the forwarding message, where the inquiry message contains a source network address set and a destination network address;
   step 3-2) the network device receiving the inquiry message searching the historical forwarded information list; if an entry matching the inquiry message is found, sending a "yes" response message to the network device sending the inquiry message, and executing step 3-3); otherwise, sending a "none" response message to the network device sending the inquiry message, and proceeding to step 3-4);
   step 3-3) the network device using a port that has received the "yes" response message as a subsequent forwarding port, modifying the movement event forwarding message based on subsequent forwarding information contained in the "yes" response message, and forwarding the modified movement event forwarding message from the subsequent forwarding port; and
   step 3-4) the network device receiving the "none" response message, or not receiving any response message, and not propagating the movement event forwarding message.

3. The method for propagating a movement event message of a network entity according to claim 2, wherein step 3-2) specifically comprises:
   step 3-2-1) after receiving the inquiry message, the network device extracting the receiving port identifier of a port that has received the inquiry message, and values of the "source network addresses set" and the "destination network address"; and merging the receiving port identifier, the each values of the "source network addresses" and the "destination network address" into a piece of search information, to obtain a total of N pieces of search information;
   step 3-2-2) searching for entries matching the search information one by one in the historical forwarded information list,
   wherein the "receiving port identifier", "source network addresses" and "destination network address" of the search information are respectively in one-to-one correspondence with values of an "egress port identifier", "source network addresses" and an "destination network address" of forwarded data in the historical forwarded information list; and
   step 3-2-3) if there is an entry that matches the search information in the history forwarding information table, sending a response message indicating "yes" from a port that has received the inquiry message; if not, sending a response message indicating "none" from the port that has received the inquiry message; or making no response; wherein the response message further comprises a set of M "source network address" values that match the search information.

4. The method for propagating a movement event message of a network entity according to claim 3, wherein an executing process of modifying the movement event forwarding message based on subsequent forwarding information contained in the "yes" response message in step 3-3) is:
   extracting the set of M "source network address" values in the response message, and modifying the movement event forwarding message, wherein the content of the modified movement event forwarding message comprises: the name of the moved network entity, the pre-movement network address, and the set of M "source network address" values extracted from the response message.

5. The method for propagating a movement event message of a network entity according to claim 4, wherein step 3) further comprises a step of periodic check:
   the network device first determining whether the times of periodic check exceeds an upper limit; if not, the network device determining, based on the "source network address" set acquired from the received movement event forwarding message, whether each of the "source network address" values has been responded with the "yes" response message; if a determination result is positive, ending a propagation process of the movement event forwarding message; otherwise, for a "source network address" that has never been responded with the "yes" response message, the network device sending the inquiry message to network devices connected to ports other than the port that has received the movement event forwarding message; and if the times of periodic check exceeds the upper limit, not performing check.

6. The method for propagating a movement event message of a network entity according to claim 1, wherein the method further comprises: a step of analyzing and determining, by the network device, whether to stop the propagation:
   step S1) acquiring the name of the moved network entity from the movement event message or the movement event forwarding message, and searching for a post-movement network address corresponding to the network entity name at the external system; and
   step S2) searching for and comparing egress ports respectively corresponding to the post-movement network address and the pre-movement network address by using a forwarding information base (FIB); and if the two egress ports are same, determining to stop propagation.

* * * * *